(12) United States Patent
Köster

(10) Patent No.: US 6,692,028 B2
(45) Date of Patent: Feb. 17, 2004

(54) VEHICLE WITH FUEL TANK

(75) Inventor: Andreas Köster, Wendlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/051,458

(22) Filed: Jan. 22, 2002

(65) Prior Publication Data

US 2002/0121772 A1 Sep. 5, 2002

(30) Foreign Application Priority Data

Jan. 20, 2001 (DE) .......................................... 101 02 636

(51) Int. Cl.[7] .............................................. B60K 15/03
(52) U.S. Cl. ...................................... 280/830; 220/562
(58) Field of Search ................................ 280/830, 834, 280/838, 784; 248/900; 180/69.4; 220/562, 88.1

(56) References Cited

U.S. PATENT DOCUMENTS

| | | | | |
|---|---|---|---|---|
| 4,371,181 A | * | 2/1983 | Monigold et al. | 280/5 A |
| 4,416,461 A | * | 11/1983 | Hayashi et al. | 280/5 A |
| 4,469,340 A | * | 9/1984 | Condet | 280/5 A |
| 4,570,446 A | | 2/1986 | Matsubara et al. | |
| 4,621,822 A | * | 11/1986 | Knochelmann et al. | 280/5 A |
| 4,765,635 A | * | 8/1988 | Okada | 280/5 A |
| 5,409,264 A | * | 4/1995 | Nakatani | 280/834 |
| 5,853,103 A | * | 12/1998 | Yamazaki | 220/562 |
| 5,924,734 A | * | 7/1999 | Fukagawa et al. | 280/830 |
| 6,042,071 A | | 3/2000 | Watanabe et al. | |
| 6,059,252 A | * | 5/2000 | Emmann et al. | 248/503 |

FOREIGN PATENT DOCUMENTS

| | | |
|---|---|---|
| DE | 3423954 | 11/1986 |
| DE | 3722034 | 9/1988 |
| DE | 4212626 | 10/1993 |
| DE | 4302546 | 4/1994 |
| DE | 19528557 | 2/1997 |
| DE | 19544593 | 7/1997 |
| DE | 19806607 | 8/1998 |

\* cited by examiner

*Primary Examiner*—Lesley D. Morris
*Assistant Examiner*—Tony Winner
(74) *Attorney, Agent, or Firm*—Crowell & Moring LLP

(57) ABSTRACT

A vehicle has at least one fuel tank for holding a fuel for the operation of a vehicle propulsion system. A fuel tank is arranged in an area in front of a front axle or behind a rear axle. Structure is provided for executing a controlled deflection movement of the fuel tank, so that in the event of an impact a movement can be executed shifting the fuel tank towards the front axle or rear axle.

14 Claims, 3 Drawing Sheets

VEHICLE WITH FUEL TANK

This application claims the priority of German application 101 02 636.6, filed Jan. 20, 2001, the disclosure of which is expressly incorporated by reference herein.

BACKGROUND AND SUMMARY OF THE INVENTION

The invention relates to a vehicle having at least one fuel tank for holding a fuel for the operation of a vehicle propulsion system.

U.S. Pat. No. 4,570,446 A1 discloses a vehicle having a tank for fuel in the form of hydrogen. In this arrangement, a plurality of cylinders is arranged in a housing and filled with a hydrogen-storing medium. In these cylinders hydrogen can be desorbed under the effect of high temperatures and fed to an internal combustion engine. The adsorption and desorption of hydrogen occurs at low pressures. It is possible, however, to carry gaseous hydrogen under high pressures in this vehicle tank.

An object of the invention is to specify a vehicle having a fuel tank, which is suitable for the transport and storage of gaseous hydrogen.

This object is achieved in a vehicle having at least one fuel tank for holding a fuel for the operation of a vehicle propulsion system, wherein one fuel tank is arranged in an area in front of a front axle or behind a rear axle, and wherein structure is provided for executing a controlled deflection movement of said one fuel tank, so that in the event of an impact a movement can be executed shifting said one fuel tank towards a respective adjacent front axle or rear axle.

The advantage of the solution according to the invention resides firstly in the fact that a very compact apparatus is created, and secondly in that it affords the facility for carrying hydrogen in the vehicle at pressures of several hundred bar. A further advantage is that in the event of a crash the tank is protected from the effect of excessive crash energy.

It goes without saying that the aforementioned features and those still to be explained below can be used not only in the particular combination specified, but also in other combinations or individually, without departing from the scope of the present invention.

Further advantages and developments of the invention are set out in the claims and in the description.

Other objects, advantages and novel features of the present invention will become apparent from the following detailed description of the invention when considered in conjunction with the accompanying drawings.

DETAILED DESCRIPTION OF THE PREFERRED EMBODIMENT

The invention is particularly suited to vehicles having a pressurized gas tank, especially to vehicles that are operated on hydrogen.

Figure 1:
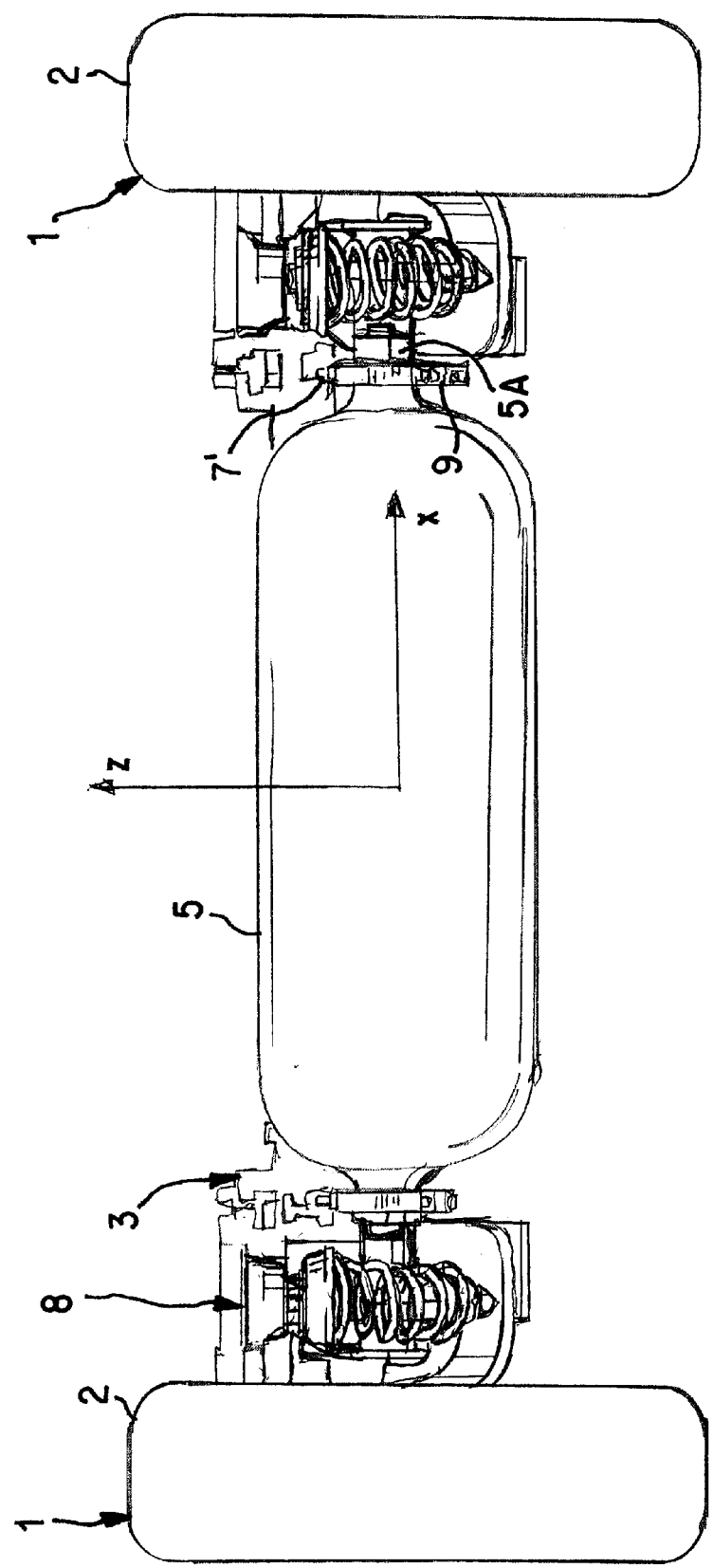
FIG. 1 is a rear view of a vehicle having a fuel tank behind a rear axle, constructed according to a preferred embodiment of the present invention.

FIG. 1 represents a rear view of a vehicle 1 according to the invention having a fuel tank 5 for holding a fuel for the operation of a vehicle propulsion system, such as a hydrogen-powered internal combustion engine or a fuel cell system. In relation to the driver, the fuel tank 5 is arranged behind the rear axle 3, thereby saving space, and extends between the two rear wheels. The wheel suspension 8 is indicated schematically.

Figure 2:
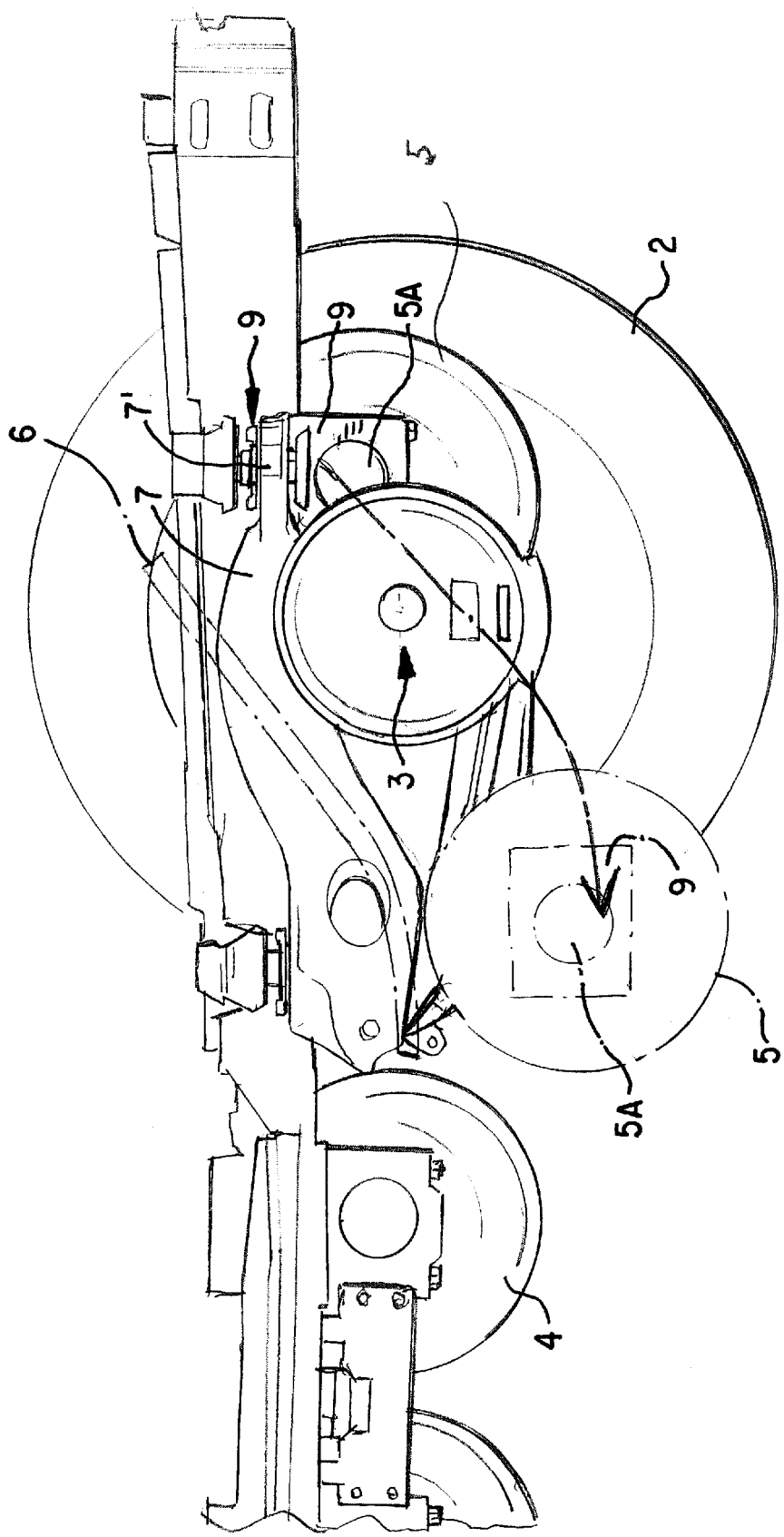
FIG. 2 is a section from a side view of a vehicle according to the invention.

FIG. 2 represents a section from a side view of the vehicle 1. The figure shows a wheel 2 with the rear axle 3 of the vehicle 1. In relation to the driver, a first fuel tank (or fuel tanks) 4 is fitted in front of the rear axle 3, and a further fuel tank 5 behind the rear axle 3. The arrangement of the fuel tanks 4, 5 in the underbody area of the vehicle 1 is particularly compact, and splitting the total amount of fuel carried in the vehicle between a plurality of fuel tanks 4, 5 allows efficient use to be made of vacant spaces. More than two fuel tanks 4, 5 or just one single fuel tank may be provided.

There is a danger, particularly in the event of a rear impact, that a deformation of the rear of the vehicle 1 may deform a fuel tank 5 fitted in the area behind the rear axle 3, or even cause it to burst. According to the invention such bursting can be largely prevented, however, by providing means for executing a controlled deflection movement of the minimum of one fuel tank 5, so that in the event of an impact a movement can be executed shifting the minimum of one fuel tank 5 towards the rear axle 3, preferably at an inclined angle to the road surface.

Figure 3:
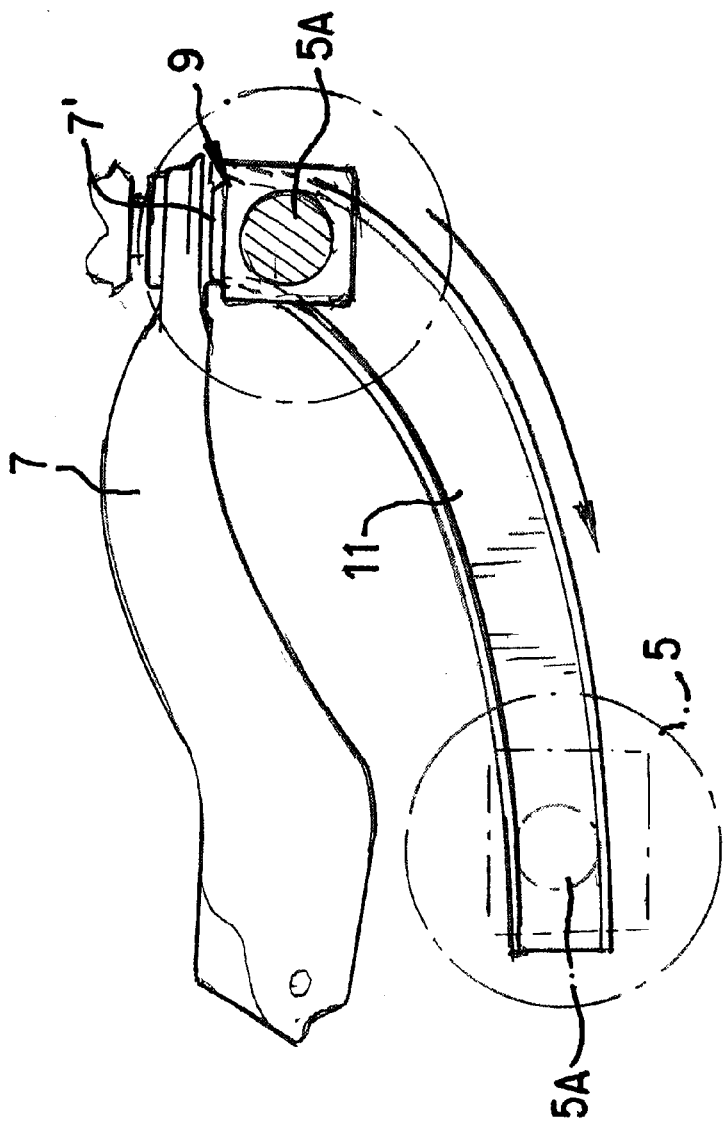
FIG. 3 is a schematic side view of a portion of the FIG. 2 structure depicting a side rail operable to guide a bearing part of an end of the fuel tank.

The structure for executing a deflection movement preferably comprises slide rails 11 (or 6 shows schematically in dash lines in FIG. 2, on which the fuel tank 5 can be guided by bearing parts 5A at the tank ends in a path towards the rear axle, preferably at an inclined angle to the road surface. For this purpose, the ground clearance of the vehicle is to be designed so that the fuel tank 5 can be shifted right under the rear axle 3, as shown schematically in dash line in FIG. 2. FIG. 3 schematically depicts one of the slide rails 11 defining a guide path for the movement of bearing end section 5A of the fuel tank 5. The opposite end of the tank 5 will have a similar bearing path guided in a similar rail 11.

The minimum fuel tank 5 is preferably bolted a body frame part 7 with rubber bearings 9. Predefined breaking points 7 are preferably provided at the fixing of the rubber bearing 9 for fuel tank 5, which breaking points detach in the event of overloading. In the event of a rear impact the fuel tank 5 can then be shifted forwards towards the rear axle 3 and to a position in front of or below the said rear axle 3. In the process the tank 5 is guided along the slide rail 6 situated above it or on a slide rail such as shown at 11 in FIG. 3. A slide rail 11 (or 6) is suitably arranged on both sides of the fuel tank, so that the fuel tank 5 does not tilt, but can perform the deflection movement while extending essentially parallel to the rear axle 3. For guiding the fuel tank 5 in the slide rail, the fuel tank preferably has corresponding slide bearings such as bearing parts 5A schematically depicted in FIGS. 2 and 3.

Alternatively, slide planes and/or slide rails may be arranged above and below the fuel tank 5, so that the fuel tank 5 can slip between these at an inclined angle to the road surface. This may act as an additional tank bursting safeguard.

The material for the slide rails and/or slide planes is designed to be as rigid as possible. A reinforced construction, such as a double-skin or sandwich structure is also advantageous.

Should a fuel tank 5 be alternatively or additionally arranged in front of the front axle of the vehicle, these considerations apply analogously in the event of a frontal impact. The fuel tank would then be shifted towards the front axle, preferably under the front axle, in the event of an impact.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Vehicle having at least one fuel tank for holding a fuel for the operation of a vehicle propulsion system
   wherein the at least one fuel tank is arranged in an area in front of a front axle or behind a rear axle, and
   wherein structure is provided for executing a controlled deflection movement of said at least one fuel tank, so that in the event of an impact, a movement can be executed shifting said at least one fuel tank towards a respective adjacent front axle or rear axle, and
   wherein the deflection movement, on a path at an inclined angle to the road surface, leads into an area below the front or rear axle and on an opposite side of the front or rear axle.

2. An automotive vehicle assembly comprising:
   a vehicle frame;
   a vehicle axle;
   a fuel tank for pressurized hydrogen which in use supply's hydrogen fuel for a vehicle propulsion system, said fuel tank being supported at the vehicle frame by detachable connections which become detached in the event of collision force on the vehicle assembly above a predetermined force value in a direction from a vehicle end toward the vehicle axle, and
   guide elements at said vehicle frame and said fuel tank which together guide the fuel tank in a predetermined path toward the vehicle axle in response to said collision forces to thereby minimize collision force damage to said fuel tank while holding the fuel tank on the vehicle frame; and
   wherein the axle is a front axle, and said guide elements are operable to guide the fuel tank from an in use position in front of the front axle to a position below and behind the front axle in response to front end collision forces.

3. An automotive vehicle assembly comprising:
   a vehicle frame,
   a vehicle axle;
   a fuel tank for pressurized hydrogen which in use supply's hydrogen fuel for a vehicle propulsion system, said fuel tank being supported at the vehicle frame by detachable connections which become detached in the event of collision force on the vehicle assembly above a predetermined force value in a direction from a vehicle end toward the vehicle axle, and
   guide elements at said vehicle frame and said fuel tank which together guide the fuel tank in a predetermined path toward the vehicle axle in response to said collision forces to thereby minimize collision force damage to said fuel tank while holding the fuel tank on the vehicle frame; and
   wherein the axle is a rear axle and said guide elements are operable to guide the fuel tank from an in use position behind the rear axle to a position below and in front of the rear axle in response to rear end collision forces.

4. Vehicle having at least one fuel tank for holding a fuel for the operation of a vehicle propulsion system
   wherein the at least one fuel tank is arranged in an area in front of a front axle or behind a rear axle, and
   wherein structure is provided for executing a controlled deflection movement of said at least one fuel tank, so that in the event of an impact, a movement can be executed shifting said at least one fuel tank towards a respective adjacent front axle or rear axle; and
   wherein said at least one fuel tank is a high-pressure tank for pressurized hydrogen.

5. Vehicle having at least one fuel tank for holding a fuel for the operation of a vehicle propulsion system
   wherein the at least one fuel tank is arranged in an area in front of a front axle or behind a rear axle, and
   wherein structure is provided for executing a controlled deflection movement of said at least one fuel tank, so that in the event of an impact, a movement can be executed shifting said at least one fuel tank towards a respective adjacent front axle or rear axle;
   wherein the structure for executing a deflection movement comprises at lest one slide rail and/or a slide plane; and
   wherein said at least one fuel tank has at least one slide bearing guided in the slide rail.

6. Vehicle according to claim 5, wherein said at least one fuel tank is fixed by way of a fixing to at least one tank bearing, which is releasable in the event of overloading.

7. Vehicle according to claim 5, wherein said at least one fuel tank is arranged in an underbody area of the vehicle.

8. An automotive vehicle assembly comprising:
   a vehicle frame,
   a vehicle axle,
   a fuel tank for pressurized hydrogen which in use supply's hydrogen fuel for a vehicle propulsion system, said fuel tank being supported at the vehicle frame by detachable connections which become detached in the event of collision force on the vehicle assembly above a predetermined force value in a direction from a vehicle end toward the vehicle axle, and
   guide elements at said vehicle frame and said fuel tank which together guide the fuel tank in a predetermined path toward the vehicle axle in response to said collision forces to thereby minimize collision force damage to said fuel tank while holding the fuel tank on the vehicle frame; and
   wherein the fuel tank is a tubular tank which in use extends transverse to a vehicle longitudinal centerline and parallel to the axle.

9. An assembly according to claim 8, wherein the guide elements include protrusions at respective opposite ends of the fuel tank and guide structure on the frame slidably engaging the protrusions.

10. An assembly according to claim 8, wherein said guide elements are operable to guide the fuel tank under the axle.

11. An assembly according to claim 8, wherein the detachable connectors include weakened sections on elastic bearing connections of the fuel tank to the frame.

12. An assembly according to claim 11, wherein the axle is a rear axle and said guide elements are operable to guide the fuel tank from an in use position behind the rear axle to a position below the rear axle in response to rear end collision forces.

13. An assembly according to claim 11, wherein the axle is a front axle, and said guide elements are operable to guide the fuel tank from an in use position in front of the front axle to a position below the front axle in response to front end collision forces.

14. An assembly according to claim 8, comprising at least one further fuel tank for pressurized hydrogen disposed at a side of the axle opposite said first mentioned fuel tank.

* * * * *